(12) United States Patent
Sasaki et al.

(10) Patent No.: US 10,851,898 B2
(45) Date of Patent: Dec. 1, 2020

(54) FLOW CONTROL VALVE AND MASS FLOW CONTROLLER USING THE SAME

(71) Applicant: HITACHI METALS, LTD., Tokyo (JP)

(72) Inventors: Ryu Sasaki, Mie (JP); Ryouichi Iwayoshi, Mie (JP)

(73) Assignee: HITACHI METALS, LTD., Tokyo (JP)

( * ) Notice: Subject to any disclaimer, the term of this patent is extended or adjusted under 35 U.S.C. 154(b) by 25 days.

(21) Appl. No.: 16/324,747

(22) PCT Filed: Sep. 29, 2017

(86) PCT No.: PCT/JP2017/035574
§ 371 (c)(1),
(2) Date: Feb. 11, 2019

(87) PCT Pub. No.: WO2018/062516
PCT Pub. Date: Apr. 5, 2018

(65) Prior Publication Data
US 2019/0195372 A1   Jun. 27, 2019

(30) Foreign Application Priority Data
Sep. 29, 2016  (JP) ................................ 2016-191249

(51) Int. Cl.
*F16K 7/16* (2006.01)
*F16K 1/42* (2006.01)

(52) U.S. Cl.
CPC . *F16K 7/16* (2013.01); *F16K 1/42* (2013.01)

(58) Field of Classification Search
CPC ... F16K 1/42; F16K 1/427; F16K 7/16; F16K 27/0236
(Continued)

(56) References Cited

U.S. PATENT DOCUMENTS

| | | | |
|---|---|---|---|
| 1,364,848 A | * | 1/1921 | Walsh .................... F16K 1/427 251/362 |
| 1,602,118 A | * | 10/1926 | Mortimer ................ F16K 27/04 137/454.5 |

(Continued)

FOREIGN PATENT DOCUMENTS

| | | |
|---|---|---|
| CN | 1768226 A | 5/2006 |
| JP | 08105551 A | 4/1996 |

(Continued)

OTHER PUBLICATIONS

Japan Patent Office, "International Search Report Regarding International Application No. PCT/JP2017/035574", dated Nov. 14, 2017, p. 5, Published in: JP.

*Primary Examiner* — William M McCalister
(74) *Attorney, Agent, or Firm* — Neugeboren O'Dowd PC (57) ABSTRACT

In a flow control valve which comprises a valve seat comprising an inner cylindrical part with a contact surface formed in its upper end part and an outer cylindrical part higher than the inner cylindrical member and a valve body that carries out an opening and closing action in a direction perpendicular to the contact surface of the valve seat, an inner cylindrical member and an outer cylindrical member, which are separate members, are airtightly fitted with each other to constitute the inner cylindrical part and the outer cylindrical part. As a result, by processing the contact surface of the inner cylindrical part to be smooth, the flow control valve can control flow rate of gas in a small flow rate range more accurately than before.

20 Claims, 3 Drawing Sheets

(58) Field of Classification Search
USPC ......... 251/321, 322, 335.1, 335.2, 361, 362, 251/363
See application file for complete search history.

(56) References Cited

U.S. PATENT DOCUMENTS

| | | | | |
|---|---|---|---|---|
| 1,749,774 A * | 3/1930 | McKay | ............ | F16K 41/12 251/272 |
| 1,800,995 A * | 4/1931 | Floyd | ............ | G05D 16/0652 137/505.36 |
| 2,061,028 A * | 11/1936 | Forbes | ............ | F16K 41/12 251/128 |
| 2,370,397 A * | 2/1945 | Ellinwood | ............ | 251/321 |
| 2,485,092 A * | 10/1949 | Gannon | ............ | F16K 1/465 251/332 |
| 2,692,750 A * | 10/1954 | Davis, Jr. | ............ | F16K 1/385 251/210 |
| 2,933,284 A * | 4/1960 | Yocum | ............ | F16K 41/12 251/278 |
| 3,071,344 A * | 1/1963 | Banks | ............ | F16K 1/52 251/210 |
| 3,073,566 A * | 1/1963 | Bredtschneider | ....... | F16K 1/427 251/362 |
| 3,082,786 A * | 3/1963 | McLean | ............ | F16K 27/02 137/454.5 |
| 3,144,042 A * | 8/1964 | Glauber | ............ | F16K 41/10 137/454.6 |
| 3,153,421 A * | 10/1964 | Webster | ............ | F16K 1/42 137/315.36 |
| 3,318,577 A * | 5/1967 | Banks | ............ | F16K 39/024 251/332 |
| 3,396,940 A * | 8/1968 | Jones | ............ | F16K 41/12 251/335.1 |
| 3,428,076 A * | 2/1969 | Lowe | ............ | F16K 1/38 137/329.05 |
| 3,762,685 A * | 10/1973 | Curran | ............ | F16K 27/02 251/362 |
| 3,789,870 A * | 2/1974 | Keller, III | ........... | F16K 27/0263 137/454.5 |
| 3,952,994 A * | 4/1976 | Karr, Jr. | ............ | F16K 1/34 251/210 |
| 4,064,904 A * | 12/1977 | Tolnai | ............ | F16K 31/508 137/454.5 |
| 4,354,666 A * | 10/1982 | McHale | ............ | F16K 41/12 251/214 |
| 4,493,338 A * | 1/1985 | Petursson | ............ | F16K 27/02 137/454.2 |
| 4,606,374 A * | 8/1986 | Kolenc | ............ | F16K 37/00 137/556.3 |
| 4,760,990 A * | 8/1988 | Kerger | ............ | F16K 1/302 251/335.2 |
| 5,050,633 A * | 9/1991 | Tarnay | ............ | F16K 1/34 137/454.5 |
| 5,103,857 A * | 4/1992 | Kuhn | ............ | F16K 21/04 137/315.13 |
| 5,188,338 A * | 2/1993 | Itoi | ............ | F16K 31/506 251/265 |
| 5,406,973 A * | 4/1995 | Lange | ............ | F16K 1/02 137/454.5 |
| 5,516,078 A * | 5/1996 | Wellener, III | .......... | F16K 1/302 251/266 |
| 5,624,102 A * | 4/1997 | Nishimura | ............ | F16K 41/12 251/335.2 |
| 5,669,414 A * | 9/1997 | Miller | ............ | F16K 1/305 137/312 |
| 5,669,596 A * | 9/1997 | Yoshikawa | ............ | F16K 41/12 251/335.2 |
| 5,722,638 A * | 3/1998 | Miller | ............ | F16K 1/305 251/266 |
| 6,003,551 A * | 12/1999 | Wears | ............ | F16K 1/06 137/625.33 |
| 6,095,186 A * | 8/2000 | Nagel | ............ | F16K 1/465 137/516.29 |
| 6,354,562 B1 * | 3/2002 | Fukano | ............ | B01D 46/0068 251/30.02 |
| 6,554,251 B2 * | 4/2003 | Takeda | ............ | F16K 1/305 251/276 |
| 7,028,712 B2 * | 4/2006 | Wears | ............ | F16K 1/52 137/625.33 |
| 7,686,280 B2 * | 3/2010 | Lowery | ............ | F16K 7/14 251/362 |
| 7,954,788 B2 * | 6/2011 | Davies, Jr. | ............ | F16K 1/42 251/365 |
| 2007/0131890 A1 * | 6/2007 | Nicolini | ............ | F16K 41/12 251/335.2 |
| 2007/0252103 A1 * | 11/2007 | Wu | ............ | F16K 7/17 251/335.2 |
| 2014/0027661 A1 * | 1/2014 | Feldmeier | ............ | F16K 31/122 251/335.2 |
| 2014/0319403 A1 * | 10/2014 | Kitano | ............ | F16K 7/16 251/331 |
| 2017/0074417 A1 * | 3/2017 | Okawara | ............ | F16K 31/0686 |

FOREIGN PATENT DOCUMENTS

| | | |
|---|---|---|
| JP | 2006283967 A | 10/2006 |
| JP | 2014190452 A | 10/2014 |
| JP | 2015175394 A | 10/2015 |

\* cited by examiner

FLOW CONTROL VALVE AND MASS FLOW CONTROLLER USING THE SAME

BACKGROUND

Field

The present invention is an invention regarding a flow control valve, and relates to the flow control valve especially built and used in a mass flow controller.

Background

A mass flow controller is control equipment constituted by parts including a flow meter which measures flow rate of fluid, a flow control valve which controls the flow rate of the fluid, and a control circuit which controls these, at least. The mass flow controller has been widely used for the purpose of controlling mass flow rate of gas supplied into a chamber in a manufacturing process of a semiconductor, etc., for example.

There are various types of flow control valves for being used in a mass flow controller. In a mass flow controller used for controlling mass flow rate of gas in a manufacturing process of a semiconductor, a flow control valve having a structure in which a part constituting a valve for opening and closing a channel of the gas and a part having a function for driving the valve are airtightly isolated from each other by a metal diaphragms. In accordance with a flow control valve having such a structure, since all the members which contact with gas can be constituted by metal, such as stainless steel excellent in corrosion resistance, gas leakage resulting from corrosion of a member which contacts with gas can be prevented effectively even in a case where flow rate of corrosive gas is controlled.

For example, Japanese Patent Application Laid-Open (kokai) No. H08-105551 discloses a structure of a flow control valve comprising a valve seat which has a contact surface, a valve body to which with a spring gives elastic force in a direction away from the contact surface of the valve seat, and a piezo actuator which drives the valve body to be pushed back toward the contact surface of the valve seat against the elastic force by the spring, and in which the valve body and the piezo actuator are airtightly isolated from each other by a diaphragm. Since the valve body which carries out an opening and closing action perpendicular to the contact surface of the valve seat is constituted by a rigid body, this flow control valve is excellent in durability as compared with a flow control valve having a structure in which a diaphragm which can be elastically deformed is directly pushed toward the contact surface of the valve seat. This flow control valve is a normally open type flow control valve which opens when the piezo actuator does not drive the valve body Moreover, Japanese Patent Application Laid-Open (kokai) No. 2014-190452 discloses a structure of a flow control valve comprising a valve seat which has a contact surface, a valve body to which with a spring gives elastic force in a direction approaching to the contact surface of the valve seat, and an actuator which drives the valve body in a direction away from the contact surface of the valve seat against the elastic force by the spring, and in which the valve body and the actuator are airtightly isolated from each other by a diaphragm. This flow control valve is a normally closed type flow control valve which is closed when the piezo actuator does not drive the valve body.

By the way, in a manufacturing process of a semiconductor, it may be demanded to control flow rate of gas in a small flow rate range more accurately than before. In such a case, even when a gap between the contact surface of the valve seat and a surface of the valve body at a position facing the contact surface is small, it is necessary to accurately control magnitude of the gap to an any value. For this purpose, it is preferable that both the contact surfaces of the valve seat and the surface of the valve body are processed to be smooth such that surface roughness of them becomes as small as possible and arranged so as to keep a positional relation parallel to each other.

Figure 3:
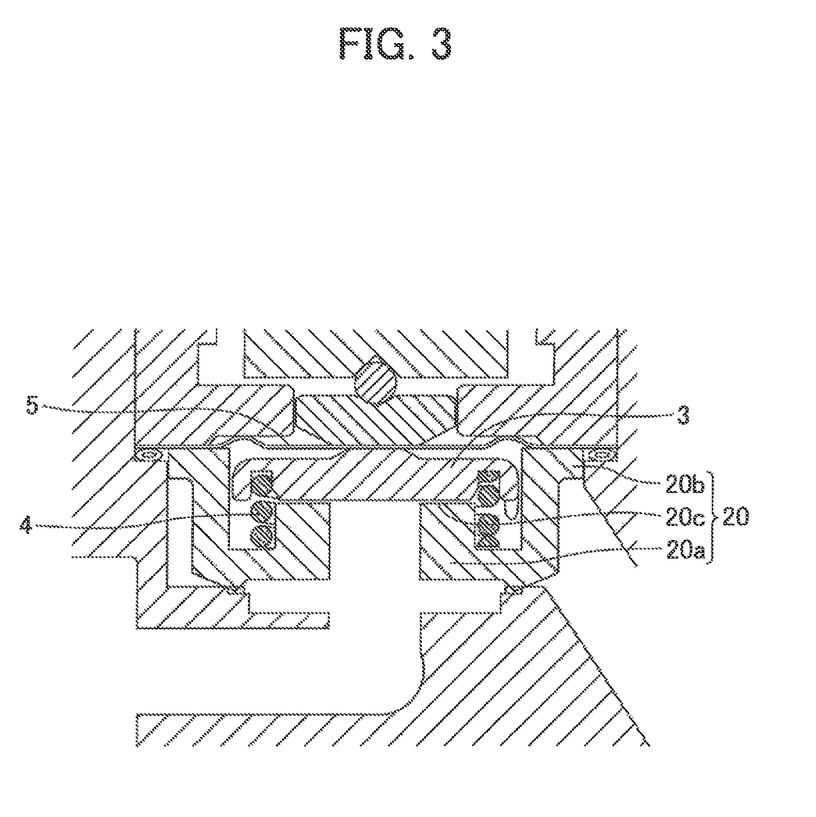
FIG. 3 is a is a schematic view for showing an example of a structure of a flow control valve according to a conventional technology.

FIG. 3 is a schematic view for showing an example of a structure of a valve seat designed so as to fill the above-mentioned demand. As for a valve seat 20 exemplified in FIG. 3, an inner cylindrical part 20a and an outer cylindrical part 20b are constituted integrally. Height of the outer cylindrical part 20b from the bottom is higher as compared with height of the inner cylindrical part 20a. A contact surface 20c of the valve seat 20 is formed in an upper end part of the inner cylindrical part 20a. A valve body 3 is built at a position higher than the contact surface 20c of the inner cylindrical part 20a on an inner circumference side of the outer cylindrical part 20b. Elastic force is given to the valve body 3 in a direction away from the contact surface 20c by an elastic means 4.

The contact surface 20c and an upper end surface of the outer cylindrical part 20b are processed so as to keep a positional relation parallel to each other. Therefore, by making the upper end surface of the outer cylindrical part 20b come into contact with a diaphragm 5 to fix the upper end surface of the outer cylindrical part 20b, the contact surface 20c and the diaphragm 5 can be maintained in a positional relation in which the contact surface 20c and the diaphragm 5 are kept at a predetermined distance and parallel to each other. Moreover, an upper surface and a lower surface of the valve body 3 are processed so as to keep a positional relation parallel to each other. Therefore, by making the upper surface of the valve body 3 come into contact with the diaphragm 5, the contact surface 20c and the diaphragm 5 can be kept in the positional relation in which the contact surface 20c and the diaphragm 5 are kept at a predetermined distance and parallel to each other. Thus, the contact surface 20c and the lower surface of the valve body 3 are arranged so as to be parallel to the diaphragm 5, respectively. As a result, the contact surface 20c and the lower surface of the valve body 3 are kept in the positional relation in which the contact surface 20c and the lower surface of the valve body 3 are kept at a predetermined distance and parallel to each other.

SUMMARY

According to an aspect, a flow control valve includes a valve seat, a valve body which carries out an opening and closing action in a direction perpendicular to a contact surface of said valve seat, and an elastic means which gives said valve body elastic force in a direction away from said contact surface or a direction approaching to said contact surface. The flow control valve includes a driving means which drives said valve body in a direction opposite to the elastic force by said elastic means. The valve seat comprises an outer cylindrical member which has a discharge passage of fluid including one or more holes for bringing an inner circumference side and an outer circumference side of said outer cylindrical member in communication with each other and a groove part formed on said outer circumference side in communication with said hole, and an inner cylindrical member which is disposed on the inner circumference side of said outer cylindrical member, has an inflow passage of the fluid on an inner circumference side of said inner cylindrical member, and has said contact surface on an upper end part of said inner cylindrical member, and a lower part of said outer cylindrical member and a lower part of said inner cylindrical member are airtightly fitted with each other.

According to another aspect, a mass flow controller includes a flow meter which measures flow rate of fluid, a flow control valve which controls the flow rate of the fluid, and a control circuit which controls a valve opening position of said flow control valve based on a flow rate signal from said flow meter. The mass flow controller also includes a flow control valve that includes a valve seat, a valve body which carries out an opening and closing action in a direction perpendicular to a contact surface of said valve seat, and an elastic means which gives said valve body elastic force in a direction away from said contact surface or a direction approaching to said contact surface. The flow control valve includes a driving means which drives the valve body in a direction opposite to the elastic force by the elastic means. The valve seat comprises an outer cylindrical member which has a discharge passage of fluid including one or more holes for bringing an inner circumference side and an outer circumference side of said outer cylindrical member in communication with each other and a groove part formed on said outer circumference side in communication with said hole, and an inner cylindrical member which is disposed on the inner circumference side of said outer cylindrical member, has an inflow passage of the fluid on an inner circumference side of said inner cylindrical member, and has said contact surface on an upper end part of said inner cylindrical member, and a lower part of said outer cylindrical member and a lower part of said inner cylindrical member are airtightly fitted with each other.

DETAILED DESCRIPTION

In the valve seat 20 shown in FIG. 3, the contact surface 20c is arranged at a position lower than the upper end surface of the outer cylindrical part 20b on an inner circumference side of the outer cylindrical part 20b. Therefore, when the contact surface 20c is to be polished with a wrap grinder, etc. for the purpose of making the contact surface 20c smooth, the outer cylindrical part 20b obstructs a machining surface (polishing surface) of the tooling from contacting with the contact surface 20c. For this reason, a problem that the contact surface 20c cannot be processed to be smooth with a wrap grinder, etc. occurs.

As solution to this problem, precision manipulation on the contact surface 20c may be performed to make it smooth by manually holding a buff grinder which has a polishing unit smaller than an internal diameter of the outer cylindrical part 20b and pressing the polishing unit against the contact surface 20c after rough processing of the contact surface 20c with a lathe, etc., for example. However, in accordance with this processing method, the contact surface 20c cannot be uniformly processed. Therefore, the demand level, such as smoothness, flatness and parallelism of the contact surface 20c, demanded for a flow control valve cannot be fulfilled.

The present invention has been conceived in view of the above-mentioned problem which a flow control valve according to a conventional technology, and one of objectives thereof is to provide a flow control valve which has a smooth contact surface and can control flow rate of gas in small flow rate range more accurately than before.

As a solution, a flow control valve according to an embodiment of the present invention is a flow control valve comprising a valve seat, a valve body, an elastic means, and a driving means for the valve body, the valve seat comprises an outer cylindrical member which has a discharge passage of fluid consisting of one or more holes for bringing an inner circumference side and an outer circumference side of the outer cylindrical member in communication with each other and a groove part formed on the outer circumference side in communication with the hole, and an inner cylindrical member which is disposed on the inner circumference side of the outer cylindrical member, has an inflow passage of the fluid on an inner circumference side of the inner cylindrical member, and has a contact surface (valve seat surface) on an upper end part of the inner cylindrical member, and a lower part of the outer cylindrical member and a lower part of the inner cylindrical member are airtightly fitted with each other.

In this configuration of the present invention, the contact surface (valve seat surface) formed in the upper end part of the inner cylindrical member can be placed on a polishing surfaces of a wrap grinder, etc., and can be subjected to precision manipulation in a state where the inner cylindrical member which constitutes the valve body is separated from the outer cylindrical member. Thereby, the demand level, such as smoothness, flatness, and parallelism of the contact surface, demanded for a flow control valve can be fulfilled easily. Moreover, a valve seat which has a smooth contact surface can be configured by inserting the inner cylindrical member with the contact surface, on which the precision manipulation has been completed, into the outer cylindrical member to fit them with each other. Therefore, in accordance with the flow control valve according to the present invention, flow rate of gas can be controlled in a small flow rate range more accurately than before.

A mass flow controller according to the present invention comprises the flow control valve according to the present invention. In accordance with this configuration of the present invention, a mass flow controller which can control flow rate of gas in a small flow rate range more accurately than before can be provided.

In accordance with embodiments of the present invention, advantages include a flow control valve which has a smooth contact surface and can control flow rate of gas in a small flow rate range more accurately than before can be provided.

Embodiments for carrying out the present invention will be explained in detail using drawings. However, the embodiments explained here of the implementation explained here merely exemplify embodiments of the present invention, and embodiments of the present invention is not limited to the embodiments exemplified here. Moreover, in the present specification, terms "upper (upward)" and "lower (downward)" mean an upward direction or a downward direction in drawings attached to the present application, and have no concern with a direction of gravity when the flow control valve is actually used.

Figure 1:
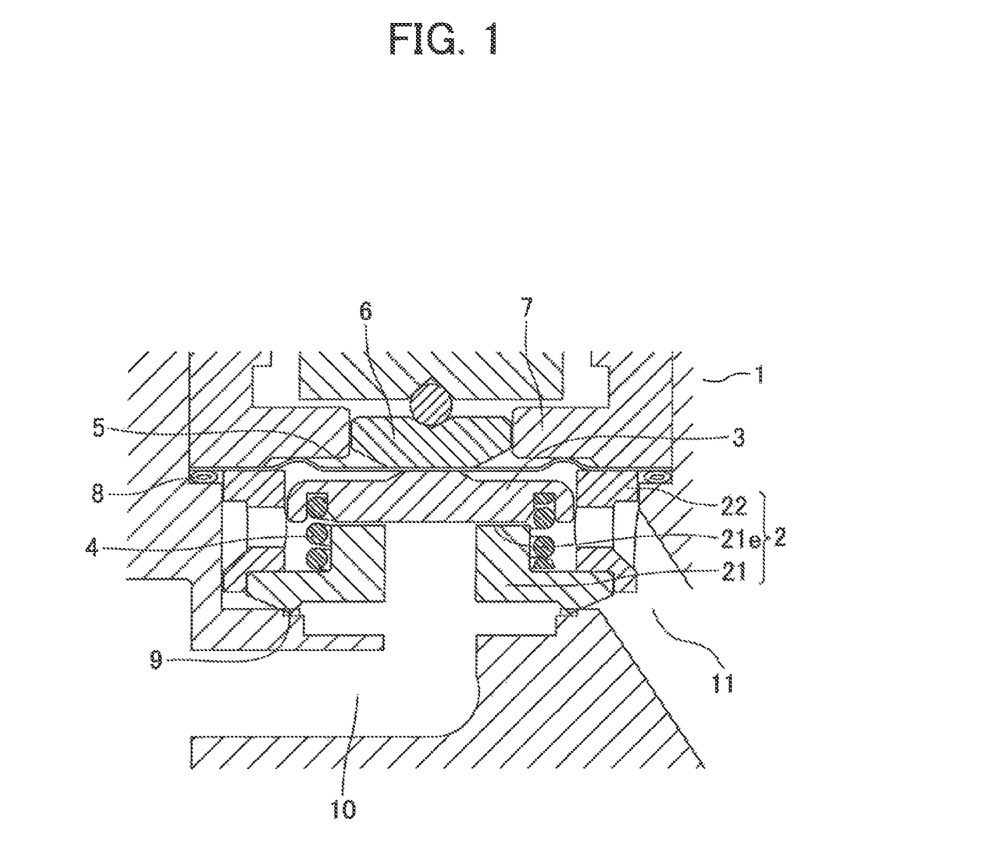
FIG. 1 is a is a schematic view for showing an example of a structure of a flow control valve according to the present invention.

FIG. 1 is a schematic view for showing an example of a structure of a flow control valve according to the present invention. A flow control valve 1 comprises a valve seat 2, a valve body 3 which carries out an opening and closing action in a direction perpendicular to a contact surface 21e of the valve seat 2, an elastic means 4 which gives the valve body 3 elastic force in a direction away from the contact surface 21e, and a driving means which drives the valve body 3 in a direction, in which the valve body 3 is pushed back toward the contact surface 21e against the elastic force by the elastic means 4 (namely, in a direction opposite to the elastic force by the elastic means 4).

The flow control valve 1 exemplified in FIG. 1 is configured as a lift valve, i.e., a closing device which comprises at least one component having a closing member for carrying out an opening and closing action in a direction perpendicular to a contact surface. The valve body 3 in FIG. 1 corresponds to the closing member here. The valve body 3 carries out an opening and closing action in a direction perpendicular to the contact surface 21e formed in an upper end part of the inner cylindrical member 21 which constitutes the valve seat 2. Namely, the contact surface 21e corresponds to what is called a "valve seat surface."

As the driving means, an electric means, such as a piezo-electric element and a solenoid coil, can be used, for example. The driving means can comprise a valve rod (stem) 6 for transmitting driving force generated by the electric means to the valve body 3. As the elastic means 4, a coiled spring, etc. can be used, for example.

When closing the flow control valve 1, an inflow passage is closed by pushing the valve body 3 downward in FIG. 1 against the elastic force by the elastic means 4 with the driving means to make a lower surface of the valve body 3 come into contact with the contact surface 21e of the valve seat 2. When opening the flow control valve 1, the lower surface of the valve body 3 is made apart from the contact surface 21e of the valve seat 2 by decreasing the driving force by the driving means to push the valve body 3 upward in FIG. 1 with the elastic force by the elastic means 4. Thereby, since a gap occurs between the valve body 3 and the contact surface 21e, fluid flows out of the inflow passage.

The valve seat 2, valve body 3 and elastic means 4 are airtightly isolated from the driving means by the diaphragm 5. In accordance with such a configuration of the flow control valve 1, all the members which contact with gas can be constituted by metal, such as stainless steel, with high corrosion resistance. Therefore, even in a case where flow rate of corrosive gas is controlled, gas leakage resulting from corrosion of a member which contacts with the gas can be prevented effectively.

The flow control valve 1 is incorporated and used in a cavity formed in a main body of a mass flow controller, for example. Since there is a limitation of dimensions of a mass flow controller, it is necessary to design the flow control valve 1 included in this as compact as possible. The flow control valve 1 exemplified in FIG. 1 has a structure where the valve seat 2, the elastic means 4, the valve body 3, and the diaphragm 5 are incorporated in a cavity and the diaphragm 5 is sandwiched between a diaphragm retainer 7 and an outer cylindrical member 22 to be fixed tightly.

The diaphragm packing 8 can be used for the purpose of holding airtightness between the diaphragm 5 and the cavity. Moreover, a metal packing 9 can be used for the purpose of holding airtightness between the valve seat 2 and the cavity.

The inflow passage which the inner cylindrical member 21 of the valve seat 2 has is in communication with a primary side channel 10. A discharge passage consisting of a hole and a groove part which the outer cylindrical member 22 has is in communication with a secondary side channel 11.

Figure 2:
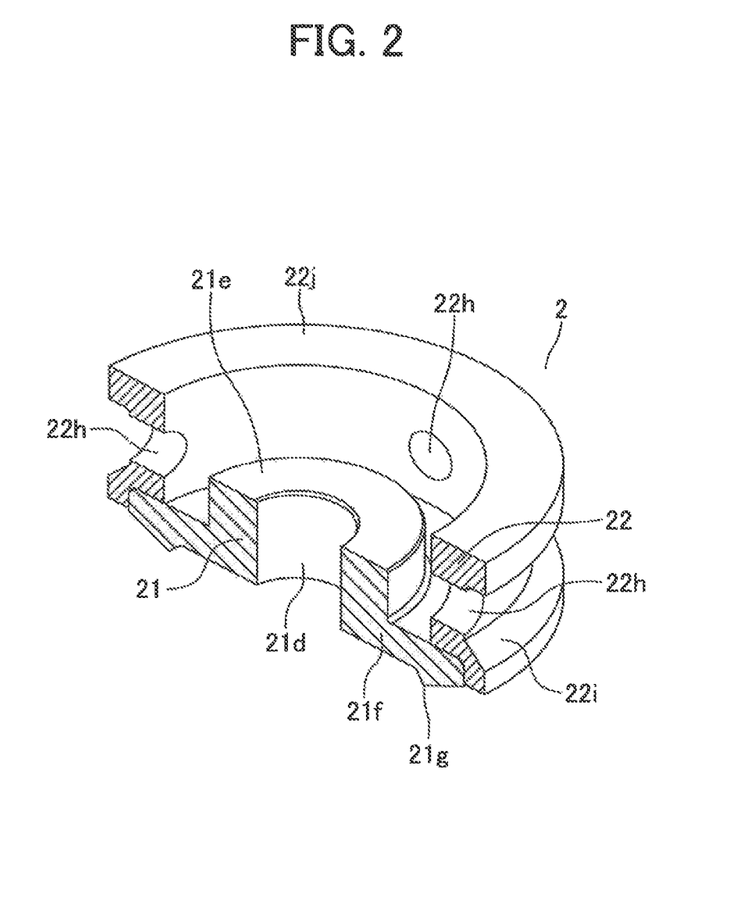
FIG. 2 is a is a cross-sectional perspective view for showing an example of a structure of a valve seat of a flow control valve according to the present invention.

FIG. 2 is a cross-sectional perspective diagram for showing an example of a structure of a valve seat of a flow control valve according to the present invention. In this figure, cross sections when the valve seat 2 is cut at a plane including a central axis of the valve seat 2 is indicated by hatching.

The valve seat 2 comprises an outer cylindrical member 22 which has a discharge passage of fluid consisting of one or more holes 22h for bringing an inner circumference side and an outer circumference side of the outer cylindrical member 22 in communication with each other and a groove part 22i formed on the outer circumference side in communication with the hole 22h, and an inner cylindrical member 21 which is disposed on the inner circumference side of the outer cylindrical member 22, has an inflow passage 21d of the fluid on an inner circumference side of the inner cylindrical member 21, and has the contact surface 21e on an upper end part of the inner cylindrical member 22. The valve body 3 is placed above the contact surface 21e of the inner cylindrical member 21, and the elastic means 4 is prepared between the valve seat 2 and the valve body 3.

When the flow control valve 1 is open, fluid goes into the inflow passage 21d from the primary side channel 10 in FIG. 1, and flows into space between the inner cylindrical member 21 and the outer cylindrical member 22 through the gap between the valve seat 2 and the valve body 3. Thereafter, the fluid flows out to the secondary side channel 11 in FIG. 1 through the discharge passage which consists of the hole 22h and the groove 22i. When the flow control valve 1 is closed, the valve seat 2 and the valve body 3 tightly contact with each other at the contact surface 21e without any gap and thereby flow of the fluid is completely blocked.

The upper end part 22j of the outer cylindrical member 22 serves as a surface which comes into contact with the diaphragm 5. In the example shown in FIG. 1, it is configured such that difference of elevation between a position of the upper end part 22j of the outer cylindrical member 22 and a position of an upper end part (namely, the contact surface 21e) of the inner cylindrical member 21 is larger than thickness of the valve body 3. Thereby, when the upper end part 22j of the outer cylindrical member 22 comes into contact with the diaphragm 5, space for incorporating the valve body 3 is secured on an inner circumference side of the outer cylindrical member 22 and above the contact surface 21e of the inner circumference member 21. Since height of this space is configured so as to be higher than the thickness of the valve body 3, spatial margin required for the opening and closing action of the valve body 3 in a direction perpendicular to the contact surface 21e is produced. However, unless the opening and closing action of the valve body 3 and deformation of the diaphragm 5 accompanying this (opening and closing action) are obstructed, a relation among the position of the upper end part 22j of the outer cylindrical member 22, the position of the upper end part of the inner cylindrical member 21, and the thickness of the valve body 3 is not limited to the above. Namely, it may be configured such that difference of elevation between a position of the upper end part 22j of the outer cylindrical member 22 and a position of an upper end part of the inner cylindrical member 21 is smaller than thickness of the valve body 3. Alternatively, it may be configured such that difference of elevation between a position of the upper end part 22j of the outer cylindrical member 22 and a position of an upper end part of the inner cylindrical member 21 is equal to thickness of the valve body 3.

The valve seat 2 is constituted by airtightly fitting a lower part of the outer cylindrical member 22 and a lower part of the inner cylindrical member 21 with each other. Thereby, in a state where the inner cylindrical member 21 is separated from the outer cylindrical member 22, the contact surface 21e of the inner cylindrical member 21 can be processed, without being obstructed by the upper end part 22j of the outer cylindrical member 22. By inserting the inner cylindrical member 21 into the outer cylindrical member 22 to fit them with each other after processing the contact surface 21e to be smooth, the valve seat 2 consisting of the inner cylindrical member 21 and the outer cylindrical member 22 can be constituted, and the contact surface 21e can be accurately held at a position parallel to the diaphragm 5. Therefore, it becomes possible to simultaneously and easily attain the smoothness, the flatness, and parallelism of the contact surface 21e, and accuracy of flow control by the flow control valve 1 can be raised easily.

In the present invention, it is preferable that the dimensions of the lower part of the outer cylindrical member 22 and the lower part of the inner cylindrical member 21 are adjusted such that the inner cylindrical member 21 and the outer cylindrical member 22 are airtightly fixed without any gap and mutual positional deviation when the inner cylindrical member 21 and the outer cylindrical member 22 are fitted with each other. Thereby, fluid can be prevented from leaking from the gap between the outer cylindrical member 22 and the inner cylindrical member 21 while dimensional accuracy of the valve seat 2 after being assembled can be improved.

In a preferred embodiment of the present invention, the lower part of the inner cylindrical member 21 has a flange 21f extending outward, and the lower part of the outer cylindrical member 22 is airtightly fitted with an outer circumference of the flange 21f, as shown in FIG. 2, for example. In the example shown in FIG. 2, the flange 21f has a function to support a lower end of the elastic means 4 while airtightly connecting the lower part of the inner cylindrical member 21 and the lower part of the outer cylindrical member 22.

An edge part 21g circumferentially projected downward may be formed in a part of the flange 21f. The edge part 21g has a function to hold airtightness of the valve seat 2 and the cavity to prevent fluid from leaking from the primary side channel 10 into the secondary side channel 11 when the contact surface 21e is closed by coming into contact with a surface which the edge part 21g faces when assembling the flow control valve 1. Position at which the edge part 21g is formed is not limited to the flange 21f, but the edge part 21g may be prepared in a part of the lower part of the inner cylindrical member 21 or the lower part of the outer cylindrical member 22. Moreover, as mentioned above, the metal packing 9 may be further prepared between the edge part 21g and the cavity.

In another preferred embodiment of the present invention different from the embodiment shown in FIG. 2, the lower part of the outer cylindrical member 22 has a flange extending inward, and the lower part of the inner cylindrical member 21 is airtightly fitted with an inner circumference of the flange. This embodiment is different from the above-mentioned embodiment in a point that the flange is configured as a part of the outer cylindrical member 22, other than a part of the inner cylindrical member 21. However, function which the flange in this embodiment has is the same as the function which the flange 21f in the embodiment shown in FIG. 2 has.

Returns to FIG. 2 again, in a preferred embodiment of the present invention, the flow control valve 1 further comprises a metal diaphragm 5 prepared so as to contact respectively with the upper end part 22j of the outer cylindrical member 22 and the upper surface of the valve body 3, the driving means is prepared to contact with a surface of the diaphragm 5 on an opposite side to a surface contacting with an upper surface of the valve body 3, and the valve body 3 is driven via the diaphragm 5 by the driving means. In accordance with this configuration, a part consisting of the valve seat 2, the valve body 3 and the elastic means 4 which constitute a valve for opening and closing a channel of gas and the driving means which has a function to drive the valve are airtightly isolated from each other by the metal diaphragms 5. Therefore, even in a case where flow rate of corrosive gas is controlled, gas leakage resulting from corrosion of a member which contacts with the gas can be prevented effectively.

In a preferred embodiment of the present invention, arithmetic average roughness of the contact surface 21e of the valve seat 3 is 100 nanometers or less. Here, the "arithmetic average roughness (Ra)" means an average of absolute values of differences between a roughness curve and a mean value for a reference length as defined as Japanese Industrial Standards B 0601:2013. The arithmetic average roughness of the contact surface 21e of the valve seat 2 can be measured using measuring equipment, such as a stylus type surface roughness tester, for example. In the present invention, since it is more desirable as the arithmetic average roughness of the contact surface 21e of the valve seat 2 is smaller, no lower limit of arithmetic average roughness is set in particular.

For attaining arithmetic average roughness of 100 nanometers or less in the contact surface 21e of the valve seat 2, for example, a method, in which the contact surface 21e of the inner cylindrical member 21 is machined with a lathe, etc. and thereafter is subjected to mirror polishing with a wrap grinder, etc., in a state where the valve seat 2 is divided into the inner cylindrical member 21 and the outer cylindrical member 22, can be employed. In a state where the inner cylindrical member 21 is separated from the outer cylindrical member 22 in the present invention, wrap polishing can be carried out while pushing the contact surface 21e of the inner cylindrical member 21 against a machining surface of a wrap grinder without being obstructed by the upper end part 22j of the outer cylindrical member 22. Therefore, in the flow control valve according to the present invention, smoothness and flatness of the contact surface 21e can be raised as compared with a flow control valve according to a conventional technology.

Since the smoothness of the contact surface 21e is higher as compared with a case where the arithmetic average roughness exceeds 100 nanometers when the arithmetic average roughness of the contact surface 21e of the valve seat 2 is 100 nanometers or less, a dimension of a gap formed between the contact surface 21e and the lower surface of the valve body 3 becomes uniform. Moreover, generation of turbulent flow resulting from unevenness of the contact surface 21e is suppressed. By these effects, in accordance with the flow control valve in which the arithmetic average roughness of the contact surface 21e of the valve seat 2 is adjusted to 100 nanometers or less, as compared with a flow control valve in which the arithmetic average roughness is not adjusted so, flow rate in an especially small flow rate range can be controlled accurately with sufficient repeatability. The arithmetic average roughness of the contact surface 21e of the valve seat 2 is more preferably 50 nanometers or less, and furthermore preferably 25 nanometers or less. The arithmetic average roughness of the contact surface 21e of the valve seat 2 can be adjusted by changing a size of abrasive grains to be used for wrap polishing and/or processing conditions, etc., for example.

In the present invention, it is preferable that arithmetic average roughness is 100 nanometers or less, not only as for the contact surface 21e of the valve seat 2, but also the lower surface of not the valve body 3 which faces this (the contact surface 21e). Since the both the contact surface 21e of the valve seat 2 and the lower surface of the valve body 3, by which an opening and closing action of the flow control valve 1 is performed, become ideal smooth surfaces by this, the effects of the present invention can be raised further. Also as for the lower surface of the valve body 3, the arithmetic average roughness is more preferably 50 nanometers or less, and further more preferably 25 nanometers or less.

Generally, the valve body 3 has a tabular shape, such as a shape of disc, etc., and its lower surface does not have a shape which impedes wrap polishing of the lower surface. However, if it is necessary to adopt a shape which impedes wrap polishing for some special purpose, the same effects as the present invention can be obtained by constituting the valve body 3 by two or more members which can be separated similarly to the valve seat 2.

In the present invention, it is preferable that the flatness of the contact surface 21e of the valve seat 2 is 20 micrometers or less. In this case, since not only the smoothness of the surface but also the flatness thereof is high, leakage of fluid can be certainly prevented when the flow control valve 1 is closed. Moreover, it becomes possible to more accurately control flow rate in a small flow rate range.

In the case of the valve seat 20 shown in FIG. 3, in which the inner cylindrical part 20a and the outer cylindrical part 20b are configured integrally, since the contact surface 20c of the inner cylindrical part 20a must be polished manually, it is quite difficult to process the contact surface 20c such that the flatness thereof is 20 micrometers or less. On the contrary to this, in a case of the valve seat 2 according to the present invention, since the inner cylindrical member 21 can be separated from the outer cylindrical member 22 and can be subjected to wrap polishing, it is not so difficult to make the flatness thereof is 20 micrometers or less. Furthermore, it is more preferable that the flatness of the lower surface of the valve body 3 is also 20 micrometers or less.

In the present invention, it is preferable that the parallelism of the contact surface 21e of the valve seat 2 with respect to a reference plane is 50 micrometers or less. As the reference plane in this case, a plane, which contacts with the edge part 21g, or a plane of the inner cylindrical member 21, which is fitted in the outer cylindrical member 22, etc., can be employed. By the parallelism being 50 micrometers or less, a gap at the contact surface 21e when closing the flow control valve 1 can be made uniform, and accuracy of flow control can be raised. Furthermore, it is preferable that the parallelism between the upper end part and lower part of the outer cylindrical member 22 and the parallelism between the upper surface and the lower surface of the valve body 3 are also 50 micrometers or less, respectively.

The above-mentioned "flatness" and "parallelism" can be measured using a surface plate and a contact type dial gage, for example. Moreover, flatness and parallelism can be obtained by non-contact type measurement which uses a laser beam, etc. In a preferable embodiment of the present invention, since it is more preferable as the flatness and parallelism of the contact surface 21e are smaller, no lower limit thereof is set in particular.

The present invention also relates to a mass flow controller comprising a flow meter which measures flow rate of fluid, a flow control valve which controls the flow rate of the fluid, and a control circuit which controls a valve opening position of the flow control valve based on a flow rate signal from the flow meter, and the flow control valve is the flow control valve 1 according to the present invention. As the flow meter and the controlling circuit, a flow meter and a controlling circuit which is incorporated and used in a conventional mass flow controller and adopts a well-known technology can be used. In the mass flow controller according to the present invention, since the flow control valve 1 according to the present invention is adopted as a flow control valve, the "effect that flow rate of gas in a small flow rate range can be controlled accurately" attained by the flow control valve 1 according to the present invention is achieved.

The flow control valve 1 according to the present invention can be constituted by incorporating the valve seat 2 and the valve body 3, etc. into the interior of a cavity prepared in a main body of the mass flow controller shown by hatching in FIG. 1. In such a configuration, since a valve box for housing the valve seat 2 and the valve body 3, etc. can be omitted, size of the flow control valve 1 and the whole mass flow controller can be made small.

Furthermore, in the case of the valve seat 20 shown in FIG. 3, in which the inner cylindrical part 20a and the outer cylindrical part 20b are configured integrally, as mentioned above, the contact surface 20c of the inner cylindrical part 20a must be polished manually, using a buff grinder, etc., for example. Therefore, an edge (edge corresponding to a ridge of a chamfer, when chamfering is performed) of the contact surface 20c tends to be dully round. On the contrary to this, in a case of the valve seat 2 according to the present invention, as mentioned above, the inner cylindrical member 21 can be separated from the outer cylindrical member 22 and can be subjected to wrap polishing. Therefore, the edge (edge corresponding to a ridge of a chamfer, when chamfering is performed) of the contact surface 20c cannot be dully round easily, and a sharp edge can be formed. It is considered that this is also one of factors which make it possible to certainly prevent leakage of fluid when the flow control valve 1 according to the present invention is closed and to control flow rate in a small flow rate range more accurately.

In addition, the valve seat 2 which the flow control valve 1 according to the present invention has is constituted by airtightly fitting the lower part of the outer cylindrical member 22 and the lower part of the inner cylindrical member 21 with each other, as mentioned above. Therefore, the valve seat 2, in which the inflow passage 21d having an internal diameter (cross section) according to a flow rate range (BIN size) of fluid to be controlled is formed, can be easily constituted only by exchanging the inner cylindrical member 21, for example. Namely, since the same outer cylindrical member 22 can be used as a common part regardless of the BIN size, effects, such as reduction of manufacturing cost and simplification of stock control of components of the valve seat 2, can be achieved, for example.

In the above-mentioned explanation, a case where the flow control valve 1 according to the present invention comprises the elastic means 4 which gives the valve body 3 elastic force in a direction away from the contact surface 21e and the driving means which drives the valve body 3 in a direction, in which the valve body 3 is pushed back toward the contact surface 21e against the elastic force by the elastic means 4 was explained. Namely, the above-mentioned flow control valve 1 is a normally open type flow control valve. However, the present invention can be applied also to a normally closed type flow control valve. Namely, the flow control valve according to the present invention may be a flow control valve which comprises an elastic means which gives the valve body elastic force in a direction approaching to the contact surface and a driving means which drives the valve body in a direction, in which the valve body is separated from the contact surface (namely, in a direction opposite to the elastic force by the elastic means).

Moreover, in the above-mentioned explanation, the valve seat 2 comprising the outer cylindrical member 22 in an approximately cylindrical shape and the inner cylindrical member 21 in an approximately cylindrical shape arranged on the inner circumference side of the outer cylindrical member 22 in a concentric circle manner (coaxially) was explained. However, unless there is a particular obstacle in an operation, and function, etc. as a flow control valve, the outer cylindrical member and the inner cylindrical member are not necessarily arranged in a concentric circle manner (coaxially), and positions of centers (axes) of the outer cylindrical member and the inner cylindrical member does not need to be in agreement with each other. Moreover, the outer cylindrical member and the inner cylindrical member do not necessarily have an approximately cylindrical shape, and each of them may have a shape of approximately elliptical cylinder or a shape of approximately polygonal cylinder, for example. Furthermore, the outer cylindrical member and the inner cylindrical member do not necessarily have the same (analogous) shape, and they may have approximately tubular shape having a cross sectional shape different from each other.

Furthermore, in the above-mentioned explanation, the configuration, in which fluid goes into the inflow passage 21d from the primary side channel 10, flows into space between the inner cylindrical member 21 and the outer cylindrical member 22 through the gap between the valve seat 2 and the valve body 3, and flows out to the secondary side channel 11 through the discharge passage consisting of the hole 22h and the groove 22i, when the flow control valve 1 is open, was explained. However, a direction through which fluid flows may be opposite to the above. Namely, a configuration in which fluid flows into space between the inner cylindrical member 21 and the outer cylindrical member 22 through the groove 22i and the hole 22h from the secondary side channel 11, goes into the inflow passage 21d through the gap between the valve seat 2 and the valve body 3, and flows out of the primary side channel 10, may be also adopted.

The invention claimed is:

1. A flow control valve comprising:
a valve seat,
a valve body which carries out an opening and closing action in a direction perpendicular to a contact surface of said valve seat,
an elastic means which gives said valve body elastic force in a direction away from said contact surface or a direction approaching to said contact surface, and
a driving means which drives said valve body in a direction opposite to the elastic force by said elastic means, wherein:
said valve seat comprises:
an outer cylindrical member which has a discharge passage of fluid consisting of one or more holes for bringing an inner circumference side and an outer circumference side of said outer cylindrical member in communication with each other and a groove part formed on said outer circumference side in communication with said hole; and
an inner cylindrical member which is disposed on the inner circumference side of said outer cylindrical member, has an inflow passage of the fluid on an inner circumference side of said inner cylindrical member, and has said contact surface on an upper end part of said inner cylindrical member, wherein:
one of a lower part of said inner cylindrical member and a lower part of said outer cylindrical member has a flange extending toward the other of said lower parts, wherein said elastic means is supported on the flange, and
said other of said lower parts is airtightly fitted with an outer circumference of said flange.

2. The flow control valve of claim 1, wherein:
the lower part of said inner cylindrical member has said flange extending outward, and
the lower part of said outer cylindrical member is airtightly fitted with an outer circumference of said flange.

3. The flow control valve of claim 1, wherein:
the lower part of said outer cylindrical member has said flange extending inward, and
the lower part of said inner cylindrical member is airtightly fitted with an inner circumference of said flange.

4. The flow control valve according to claim 1 wherein:
an arithmetic average roughness of the contact surface of said valve seat is 100 nanometers or less.

5. The flow control valve according to claim 1, wherein:
a position of an upper end part of said outer cylindrical member is configured such that difference of elevation between the position of the upper end part of said outer cylindrical member and a position of the contact surface of said inner cylindrical member is larger than thickness of said valve body.

6. The flow control valve according to claim 5 wherein:
an arithmetic average roughness of the contact surface of said valve seat is 100 nanometers or less.

7. The flow control valve according to claim 5, further comprising:
a metal diaphragm prepared so as to contact respectively with the upper end part of said outer cylindrical member and the upper surface of said valve body, wherein:
said driving means is prepared to contact with a surface of said diaphragm on an opposite side to a surface contacting with an upper surface of said valve body, and
said valve body is driven via said diaphragm by said driving means.

8. The flow control valve according to claim 7 wherein:
an arithmetic average roughness of the contact surface of said valve seat is 100 nanometers or less.

9. The flow control valve according to claim 1, further comprising:
a metal diaphragm prepared so as to contact respectively with the upper end part of said outer cylindrical member and the upper surface of said valve body, wherein:
said driving means is prepared to contact with a surface of said diaphragm on an opposite side to a surface contacting with an upper surface of said valve body, and
said valve body is driven via said diaphragm by said driving means.

10. The flow control valve according to claim 9 wherein:
an arithmetic average roughness of the contact surface of said valve seat is 100 nanometers or less.

11. A mass flow controller comprising:
a flow meter which measures flow rate of fluid,
a flow control valve which controls the flow rate of the fluid, and
a control circuit which controls a valve opening position of said flow control valve based on a flow rate signal from said flow meter, wherein:
said flow control valve includes:
a valve seat,
a valve body which carries out an opening and closing action in a direction perpendicular to a contact surface of said valve seat,
an elastic means which gives said valve body elastic force in a direction away from said contact surface or a direction approaching to said contact surface, and
a driving means which drives said valve body in a direction opposite to the elastic force by said elastic means, wherein:
said valve seat comprises an outer cylindrical member which has a discharge passage of fluid consisting of one or more holes for bringing an inner circumference side and an outer circumference side of said outer cylindrical member in communication with each other and a groove part formed on said outer circumference side in communication with said hole, and an inner cylindrical member which is disposed on the inner circumference side of said outer cylindrical member, has an inflow passage of the fluid on an inner circumference side of said inner cylindrical member, and has said contact surface on an upper end part of said inner cylindrical member, wherein:
one of a lower part of said inner cylindrical member and a lower part of said outer cylindrical member has a flange extending toward the other of said lower parts, wherein said elastic means is supported on the flange, and
said other of said lower parts is airtightly fitted with an outer circumference of said flange.

12. The mass flow controller of claim 11, wherein:
the lower part of said inner cylindrical member has said flange extending outward, and
the lower part of said outer cylindrical member is airtightly fitted with an outer circumference of said flange.

13. The mass flow controller of claim 11, wherein:
the lower part of said outer cylindrical member has said flange extending inward, and
the lower part of said inner cylindrical member is airtightly fitted with an inner circumference of said flange.

14. The mass flow controller according to claim 11 wherein:
an arithmetic average roughness of the contact surface of said valve seat is 100 nanometers or less.

15. The mass flow controller according to claim 11, wherein:
a position of an upper end part of said outer cylindrical member is configured such that difference of elevation between the position of the upper end part of said outer cylindrical member and a position of the contact surface of said inner cylindrical member is larger than thickness of said valve body.

16. The mass flow controller according to claim 15 wherein:
an arithmetic average roughness of the contact surface of said valve seat is 100 nanometers or less.

17. The mass flow controller according to claim 15, further comprising:
a metal diaphragm prepared so as to contact respectively with the upper end part of said outer cylindrical member and the upper surface of said valve body, wherein:
said driving means is prepared to contact with a surface of said diaphragm on an opposite side to a surface contacting with an upper surface of said valve body, and
said valve body is driven via said diaphragm by said driving means.

18. The mass flow controller according to claim 17 wherein:
an arithmetic average roughness of the contact surface of said valve seat is 100 nanometers or less.

19. The mass flow controller according to claim 11, further comprising:
a metal diaphragm prepared so as to contact respectively with the upper end part of said outer cylindrical member and the upper surface of said valve body, wherein:
said driving means is prepared to contact with a surface of said diaphragm on an opposite side to a surface contacting with an upper surface of said valve body, and
said valve body is driven via said diaphragm by said driving means.

20. The mass flow controller according to claim 19 wherein:
an arithmetic average roughness of the contact surface of said valve seat is 100 nanometers or less.

* * * * *